(12) United States Patent
Ravishankar

(10) Patent No.: US 7,511,106 B2
(45) Date of Patent: Mar. 31, 2009

(54) ETHYLENE ELASTOMER COMPOSITIONS

(75) Inventor: Periagaram Srinivasan Ravishankar, Kingwood, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 18 days.

(21) Appl. No.: 11/599,030

(22) Filed: Nov. 14, 2006

(65) Prior Publication Data

US 2007/0129514 A1  Jun. 7, 2007

Related U.S. Application Data

(60) Provisional application No. 60/742,794, filed on Dec. 6, 2005.

(51) Int. Cl.
- *C08F 4/76* (2006.01)
- *C08F 4/64* (2006.01)
- *C08F 4/52* (2006.01)
- *C08F 12/34* (2006.01)

(52) U.S. Cl. ............ 526/160; 526/170; 526/134; 526/147; 526/336; 526/339; 526/281

(58) Field of Classification Search ............ 526/170, 526/943, 134, 339, 280, 281, 160, 348, 336
See application file for complete search history.

(56) References Cited

U.S. PATENT DOCUMENTS

| | | | | |
|---|---|---|---|---|
| 5,656,693 A | 8/1997 | Ellul et al. | ............ | 525/171 |
| 5,696,213 A | 12/1997 | Schiffino et al. | ............ | 526/158 |
| 5,763,533 A | 6/1998 | Dharmarajan et al. | ............ | 525/211 |
| 5,952,427 A | 9/1999 | Dharmarajan et al. | ............ | 525/211 |
| 5,993,922 A | 11/1999 | Babrowicz et al. | ............ | 428/35.7 |
| 6,096,849 A | 8/2000 | Chung et al. | ............ | 526/336 |
| 6,207,756 B1 * | 3/2001 | Datta et al. | ............ | 525/191 |
| 6,271,311 B1 * | 8/2001 | Ravishankar et al. | ............ | 525/191 |
| 6,281,316 B1 | 8/2001 | Wasserman et al. | ............ | 526/282 |
| 6,291,609 B1 * | 9/2001 | Crowther et al. | ............ | 526/127 |
| 6,319,998 B1 | 11/2001 | Cozewith et al. | ............ | 526/65 |
| 6,329,477 B1 * | 12/2001 | Harrington et al. | ............ | 526/65 |
| 6,388,016 B1 * | 5/2002 | Abdou-Sabet et al. | ............ | 525/194 |
| 6,806,336 B2 | 10/2004 | Ravishankar | ............ | 526/284 |
| 7,390,866 B2 * | 6/2008 | Datta et al. | ............ | 526/339 |
| 2003/0060578 A1 | 3/2003 | Schiffino et al. | ............ | 526/114 |
| 2003/0211933 A1 | 11/2003 | Fujikawa et al. | ............ | 502/155 |
| 2005/0165189 A1 | 7/2005 | Ravishankar et al. | ............ | 526/282 |

FOREIGN PATENT DOCUMENTS

| | | |
|---|---|---|
| EP | 0 708 117 | 4/1996 |
| EP | 0 843 698 | 5/1998 |
| EP | 0 843 701 | 5/1998 |
| EP | 0 843 702 | 5/1998 |
| EP | 0 891 993 | 1/1999 |
| JP | 01054010 | 9/1993 |
| JP | 63008408 | 9/1993 |
| JP | 09241326 | 9/1997 |
| WO | WO 98/56012 | 12/1998 |
| WO | WO 99/00434 | 1/1999 |
| WO | WO 99/45046 | 9/1999 |
| WO | WO 99/45062 | 9/1999 |
| WO | WO 0206362 | 1/2002 |

* cited by examiner

*Primary Examiner*—Vasu Jagannathan
*Assistant Examiner*—Rip A. Lee

(57) ABSTRACT

This disclosure relates to olefin polymerization processes for polymerizing ethylene, higher alpha-olefin comonomer and at least one diene, especially vinyl norbornene (VNB), and especially processes for producing amorphous or semi-crystalline polymers such as ethylene propylene diene (EPDM).

15 Claims, No Drawings

ETHYLENE ELASTOMER COMPOSITIONS

CROSS REFERENCE TO RELATED APPLICATION

This application claims the benefit of Provisional Application No. 60/742,794 filed Dec. 6, 2005, the disclosure of which is incorporated by reference.

FIELD

This disclosure relates to olefin polymerization processes for polymerizing ethylene, higher alpha-olefin comonomer and dienes, especially vinyl norbornene (VNB), and especially processes for producing amorphous or semi-crystalline polymers such as ethylene propylene diene (EPDM) rubber.

BACKGROUND

Ethylene elastomer compositions typically contain ethylene, an alpha-olefin such as propylene, and a third component, such as a diene, to facilitate vulcanization. The choice of a third component can greatly influence the nature of branching reactions and resultant molecular architecture of the polymer. For example, when ethylidene norbornene (ENB) is used as the diene, as is commonly done, long chain branching through the diene is facilitated through cataionic coupling reactions in Ziegler-Natta (Z-N) polymerization, while linear polymers are produced with metallocene catalysts.

EPDMs containing VNB, which is a non-conjugated diene, are known from EP843698; EP843702 and EP843701. These polymers typically have a high level of long chain branching (LCB) when synthesized using Ziegler-Natta catalysts. High levels of LCB improve processability, but may impair physical properties of the final product after conversion of the polymer by extrusion or molding. Other methods of EPDM production are described in WO99/00434, WO 99/45062, U.S. Pat. No. 6,806,336, U.S. Pat. No. 6,096,849, and U.S. Pat. No. 6,319,998.

VNB-derived EPDM provides improved cure rate and performance in free-radical curing, improved processability from the highly branched structure, and requires a low level of diene to provide suitable physical properties in the final product comparable to ENB-derived EPDM.

The lack of branching in metallocene polymerization of ENB is believed to be due to the inability of the pendent double bond to incorporate into the polymer backbone due to steric effects. When the same metallocene catalyst is used to polymerize other third components such as divinyl benzene (DVB) or VNB, the pendant double bond incorporation is facile and leads to copious amounts of branching and gel. When used as the third component, such monomers produce a polymer with very desirable vulcanization characteristics in addition to cross-linking such as with peroxides, when compared to ENB. Therefore, it would be beneficial to the rubber industry to devise a method of incorporating dienes, particularly VNB, without excessive long chain branching or gel formation when a metallocene catalyst is employed.

SUMMARY

An embodiment of this disclosure is a process comprising: contacting a bridged bis-indenyl transitional metal metallocene catalyst compound and a non-coordinating anion (NCA) activator with alpha-olefin, ethylene, and at least one diene. The bridged bis-indenyl transitional metal metallocene catalyst compound is preferably a bridged bis-indenyl transitional metal metallocene catalyst comprising a cyclopentadienyl (Cp) complex having two ring systems for ligands; wherein these Cp complexes have the general formula: $(Cp^1R^1{}_m)R^3(Cp^2R^2{}_p)MX_q$; wherein $Cp^1$ of ligand $(Cp^1R^1{}_m)$ and $Cp^2$ of ligand $(Cp^2R^2{}_p)$ are the same, $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 1 to 5, p is 1 to 5, and two $R^1$ and/or $R^2$ substituents on adjacent carbon atoms of the cyclopentadienyl ring associated therewith can be joined together to form a ring containing from 4 to about 20 carbon atoms; $R^3$ is a bridging group, such that the number of atoms in the direct chain between the two ligands is 1 to 8, M is a transition metal having a valence of from 3 to 6, from group 4, 5, or 6 of the periodic table of the elements and is in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2.

DESCRIPTION

EPDM Polymer

The ethylene, alpha-olefin, and diene polymers, which are the products of the process described herein, comprise units derived from ethylene, alpha-olefin and a diene.

The overall monomer composition of the ethylene, alpha-olefin, and diene polymer can range broadly. Preferably the polymer contains 40 to 80 wt % of ethylene-derived units, more preferably from 40 to 75 wt % ethylene-derived units, and from 0.3 to 15 wt % of one or more diene-derived units. The higher alpha olefin forms the balance. In a preferred embodiment, the polymer contains preferably from 0.3 to 3 wt % diene, and more preferably from 0.3 to 1.5 wt % diene. As used herein when referring to the polymer, wt % is based on the total weight of the polymer.

The alpha olefin is preferably one or more $C_3$ to $C_8$ alpha olefins, more preferably propylene or butene, and most preferably propylene. The amount of alpha-olefin in the polymer may vary from about 95 wt % to about 15 wt %, preferably from about 80 wt % to about 20 wt %, and most preferably from about 60 wt % to about 20 wt %.

The diene is preferably selected from the group consisting of: 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), ethylidene norbornene (ENB), and combinations thereof, most preferably VNB. The amount of diene in the ethylene, alpha-olefin, and diene polymer may vary from 0.3 to 6 wt %, preferably from 0.3 to 3 wt %, and more preferably from 0.3 to 2 wt %.

In a preferred embodiment, the amount of ethylene in the ethylene, alpha-olefin, and diene polymer of the process described herein may vary from about 5 wt % to about 85 wt %, preferably from about 20 wt % to about 80 wt %, and most preferably from about 40 wt % to about 80 wt %. Ethylene content is determined by ASTM D3900, and is not corrected for diene content. ENB content incorporated in the polymer is determined by FTIR, ASTM D6047. The diene content of a terpolymer comprising VNB is preferably measured via H NMR. These methods measure available unsaturation. Thus, the measured incorporation may be lower than the actual incorporation because dienes having pendant unsaturated moieties have been converted, e.g., by hydrogen, and are not detected in the measurement. If both ENB and VNB are present, $^{13}C$ NMR is preferably used to determine diene content.

The ethylene, alpha-olefin, and diene polymers, which are the products of the process described herein, are preferably not highly branched. The branching index (BI) is from about 0.1 to about 1.0, more preferably from about 0.5 to about 1.0, and even more preferably from about 0.9 to about 1.0.

The EPDM polymers described herein preferably have a MWD of from about 2 to about 20. As used herein, MWD (Mw/Mn) is determined according to well known methods, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc) polystyrene gel columns 802, 803, 804 and 805. This technique is discussed in "Liquid Chromatography of Polymers and Related Materials III," J. Cazes editor, Marcel Dekker. 1981, p. 207, which is incorporated herein by reference. No corrections for column spreading are employed; however, data on generally accepted standards, e.g., National Bureau of Standards Polyethylene 1484 and anionically produced hydrogenated polyisoprenes (an alternating ethylene-propylene copolymers) demonstrate that such corrections on MWD are less than 0.05 units. Mw/Mn is calculated from elution times. The numerical analyses are performed using the commercially available Beckman/CIS customized LALLS software in conjunction with the standard Gel Permeation package. Reference to Mw/Mn implies that the Mw is the value reported using the LALLS detector and Mn is the value reported using the DRI detector described above.

The relative degree of branching in the ethylene, alpha-olefin, and diene polymer is determined using a branching index factor (BI). Calculating this factor requires a series of three laboratory measurements of polymer properties in solutions as disclosed in VerStrate, Gary, "Ethylene-Propylene Elastomers", Encyclopedia of Polymer Science and Engineering, 6, $2^{nd}$ edition (1986). These are: (i) $M_{w,\ GPC\ LALLS}$, weight average molecular weight measured using a low angle laser light scattering (LALLS) technique in combination with Gel Permeation Chromatography (GPC) (ii) weight average molecular weight ($Mw_{DRI}$) and viscosity average molecular weight ($Mv_{DRI}$) using a differential refractive index (DRI) detector in combination with GPC and (iii) intrinsic viscosity (IV) measured in decalin at 135° C. The first two measurements (i and ii) are obtained in a GPC using a filtered dilute solution of the polymer in trichlorobenzene.

An average branching index (i.e., branching index as used herein) is defined as:

$$BI = \frac{M_{v,br} \times M_{w,DRI}}{M_{w,GPC\ LALLS} \times M_{v,GPC\ DRI}}$$

where, $M_{v,br} = (IV/k)^{1/a}$; and "a" is the Mark-Houwink constant (=0.759 for ethylene, propylene diene elastomeric polymers in decalin at 135° C.). From equation (1) it follows that the branching index for a linear polymer is 1.0. For branched polymers, the extent of branching is defined relative to the linear polymer. Since at a constant number average molecular weight $M_n$, $(M_W)_{branch} > (M_W)_{linear}$, BI for branched polymers is less than 1.0, and a smaller BI value denotes a higher level of branching. In place of measuring IV in decalin, it is also acceptable to measure IV using a viscosity detector in tandem with DRI and LALLS detectors in the so-called GPC-3D instrument. In this case, "k" and "a" values appropriate for the GPC solvent should be used in the equation above.

The ethylene, alpha-olefin, and diene polymer is also free from gel. As used herein, "free from gel" is defined as complete dissolution, which is 100% of the polymer in a hydrocarbon solvent such as cyclohexane, typically used to dissolve EPDM. When gel is present in the polymer, this portion will remain undissolved even at elevated temperatures.

Metallocene

The term "metallocene" and "metallocene catalyst precursor" are terms known in the art to mean compounds possessing a Group IV, V, or VI transition metal M, with a cyclopentadienyl (Cp) ligand or ligands which may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (referred to as an activator) in order to yield an active metallocene catalyst which refers generally to an organometallic complex with a vacant coordination site that can coordinate, insert, and polymerize olefins.

Preferable metallocenes are cyclopentadienyl (Cp) complexes which have two Cp ring systems for ligands. The Cp ligands preferably form a bent sandwich complex with the metal and are preferably locked into a rigid configuration through a bridging group. These cyclopentadienyl complexes have the general formula:

$(Cp^1R^1{}_m)R^3(Cp^2R^2{}_p)MX_q$

Wherein $Cp^1$ of ligand $(Cp^1R^1{}_m)$ and $Cp^2$ of ligand $(Cp^2R^2{}_p)$ are preferably the same, $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is preferably 1 to 5, p is preferably 1 to 5, and preferably two $R^1$ and/or $R^2$ substituents on adjacent carbon atoms of the cyclopentadienyl ring associated there with can be joined together to form a ring containing from 4 to about 20 carbon atoms, $R^3$ is a bridging group, such that the number of atoms, preferably carbon atoms, not including hydrogen atoms, in the direct chain between the two ligands is preferably 1 to 8, preferably 1 to 3, and most preferably $R^3$ is "—CR'$_2$—CR'$_2$—", wherein R'independently is selected from hydrogen, alkyl, aryl, halogenated alkyl, halogenated aryl and any mixtures thereof, M is a transition metal having a valence of from 3 to 6, preferably from group 4, 5, or 6 of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

Illustrative, but not limiting examples of preferred biscyclopentadienyl metallocenes are: ethylenebis (indenyl) zirconium dichloride, ethylenebis (tetrahydroindenyl) zirconium dichloride, ethylenebis (indenyl) dimethylzirconium, and the like, and the above wherein the transition metal is hafnium or titanium, including ethylene-bis-indenyl-zirconium dimethyl and ethylene-bis-indenyl-hafnium dimethyl.

Non-coordinating Anions

As already mentioned the metallocene or metallocene catalyst precursor is activated with a non-coordinating anion. The term "non-coordinating anion" (NCA) means an anion which does not coordinate to said transition metal cation thereby remaining sufficiently labile to be displaced by a neutral Lewis base. "Compatible" NCAs are those which are not degraded to neutrality when the initially formed complex decomposes. Further, the anion will not transfer an anionic substituent or fragment to the cation so as to cause it to form a neutral four coordinate metallocene compound and a neutral by-product from the anion. NCAs are preferably those which are compatible, stabilize the metallocene cation in the sense of balancing its ionic charge, yet retain sufficient lability to permit displacement by an ethylenically or acetylenically unsaturated monomer during polymerization. Additionally, the anions useful in this disclosure are preferably large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. NCA-generating activators of the type described in EP277004 are preferred. The preferred activator is dimethylaniliniumtetrakis(heptafluoronaphthyl)borate which is commercially available from Albemarle Corporation (Baton Rouge, La.).

Process

EPDM compositions containing substantial amounts of VNB as the third component are preferably prepared in a continuous process using a metallocene catalyst. It is believed that substituting hafnium (Hf) in place of zirconium (Zr) in the catalyst would allow operation at higher reactor temperatures for the production of equivalent or higher molecular weight products.

Generally speaking, any process may be used to prepare the polymers of this disclosure including a single reactor or by mechanical blending. The preferred process employs the use of a single continuous flow stirred tank reactor (CSTR). Other modifications such as the use of two reactors in series or parallel to tailor the MWD of the polymer are also contemplated.

It may be desirable to increase sulfur curable unsaturation along the polymer chain. ENB may be added during polymerization, to obtain a sulfur curable polymer. Generally, to impart sulfur curability, from about 0.5 to about 10 wt % ENB (based on the weight of the feed) is preferably added to the reactor.

The EPDM polymers described herein are preferably prepared in a single CSTR at a temperature range of about 20-200° C., a pressure of about 50-2000 psi (about 350-14000 kPa) and residence time of about 5-15 minutes.

Any number and type of additives may be compounded with the polymer compositions of this disclosure including but not limited to: carbon black, plasticizer like paraffinic oil, process aids such as fatty acids, waxes etc., antioxidants, curatives, fillers such as calcium carbonate, clay, silica and the like, antiozonants, tackifiers, and scorch inhibiting agents.

These polymer compositions may be cured or vulcanized according to known methods. For example using agents such as peroxide that forms a C—C bond or hydrosilation that forms a C—Si—C bond as is described in "Vulcanization", Chapter 7 of "Science and Technology of Rubber", by A. Y. Coran, (F. R Eirich, editor) Academic Press Inc., 1978.

The composition can be formed into bales or pellets for subsequent processing, compounding and mastication. In certain embodiments, the polymeric blends are formed into polymer pellets. In one embodiment of the disclosure, the polymer is directly extruded through a die plate and pelletized as it leaves the devolatizer. The polymer is cut into little pellets using an under-water pelletizer. The pellets are conveyed to a spin dryer to remove the water. The pellets then make their way into a fluidized bed dryer to remove moisture and other volatile components. The dry product is then packaged for sale. In one embodiment of the disclosure, a bale press is used to recombine the pellets into large bales, typically weighing about 11 to about 45 kilograms.

The ethylene, alpha-olefin, and diene polymers of this disclosure can be used in a variety of peroxide-cured EPDM applications such as weather seals, coolant hoses, roofing membranes, wire and cable insulations, dynamically vulcanized alloys, power transmission belts, engine mounts, thermo plastic olefin blends and the like.

EXAMPLES

Test Methods

TABLE 1

| Parameter | Units | Test |
|---|---|---|
| Mooney Viscosity | ML (1 + 4) @ 125° C., MU | ASTM D 1646 |
| Ethylene Content | wt % | ASTM D 3900 |
| Vinyl Norbornene (VNB) Content | wt % | FTIR |
| Melt Index Ratio (MI/MFR) ($I_{21}/I_2$) | None | ASTM D-1238-F and ASTM D-1238-E |

The ratio of $I_{21}/I_2$ is known as the melt index ratio (MIR). MIR is generally a function of both MW and MWD. At a given MI, a higher MIR would typically imply a higher level of long chain branching.

Examples 1-2

Examples 1 and 2 measured properties of existing commercially available polymers. Certain properties were measured as outlined in Table 2. The polymer of Example 1 was an ExxonMobil Chemical EPDM elastomer with a Mooney viscosity of 24, an ethylene content of about 76 wt %, a VNB content of about 0.9% and was prepared by a conventional Ziegler-Natta process. The polymer of Example 2 was an ethylene propylene copolymer, with a Melt Index of about 1, an ethylene content of about 72 wt % and was produced with a metallocene catalyst. The polymer of Example 2 was substantially linear as indicated in Table 3 by a branching index of 0.67.

Examples 3-4

The polymers of Examples 3 and 4 were made under the process conditions as shown in Table 2 to produce polymers tested under the same parameters as the comparative Examples 1 and 2 as shown in Table 3. The production rate was measured by timed collection of a known weight of effluent and by measuring the solids concentration by evaporating the solvent.

The VNB-EPDM polymers of Examples 3 and 4 were prepared as follows. The monomers were mixed with solvent (hexane) and delivered to the reactor as a mixed feed stream. The catalyst and activator were pre-mixed in 900 cc of toluene and delivered to the 1 liter CSTR reactor with a metering pump. Ethylene-bis-indenyl-zirconium dimethyl (Et(Ind)$_2$ZrMe$_2$) was used as the catalyst, dimethylaniliniumtetrakis (heptafluoronaphthyl)borate as the activator, and tri-n-octylaluminum (TNOA) as the scavenger. The catalyst and activator were added in a molar ratio of 1 to 1. The process was carried out at 50° C. The residence time in the reactor was maintained at 7 minutes.

The polymer data for Examples 1-4 is shown in Table 3. The MLRA data of Table 3 shows that the polymer of Example 3 has less branching than the polymer of Example 1 at the same level of VNB. Examples 3 and 4 have a higher branching index (BI) than the polymer of Example 1, which means they were more linear polymers. The polymer at higher VNB level (Example 4) was long chain branched.

As seen in Table 3, comparison between Examples 1 and 4 shows that the inventive process (Example 4) produces a polymer that not only matched the desired branching level of the conventional Ziegler-Natta catalyzed EPDM product (Example 1), but surpassed it and was more linear. The inventive process allows the addition of twice the VNB (1.8 wt %) as the Z-N process (0.9 wt %) with still no undesirable gel formation.

TABLE 2

| Example | Catalyst Feed Rate (mg/h) | Scavenger (TNOA) Rate (mg/h) | Ethylene Rate (g/h) | Propylene Rate (g/h) | VNB Rate (g/h) | Solvent Rate (g/h) | Reactor Temp. (° C.) | Production Rate (g/h) | $C_2$ Conv | $C_3$ Conv | VNB Conv |
|---|---|---|---|---|---|---|---|---|---|---|---|
| Example 3 | 2 | 118.3 | 207 | 570.6 | 8.01 | 3564 | 50 | 377 | 91% | 33% | 48% |
| Example 4 | 1 | 118.3 | 207 | 324 | 8.01 | 3564 | 50 | 261 | 83% | 26% | 59% |

TABLE 3

| Example | Wt % ethylene | Wt % VNB | MI | MIR | ML (1 + 4) 125° C. | $Mw_{Lalls}$ | $Mz_{Lalls}$ | $Mw_{Dri}$ | $Mn_{Dri}$ | BI | g' | $Mw_{Lalls}/Mn_{DRI}$ |
|---|---|---|---|---|---|---|---|---|---|---|---|---|
| Example 1 (Comparative) | 76.5 | 0.9 | 0.12 | 167 | 23 | 291500 | 6850250 | 126000 | 22300 | 0.39 | Not measured | 13.1 |
| Example 2 (Comparative) | 72 | 0 | 1 | 60 | Not measured | 83895 | 150411 | 71498 | 29951 | 0.67 | 0.75 | 2.8 |
| Example 3 (Inventive) | 50.7 | 1.0 | 22.6 | Not measured | Not measured | 89277 | 416427 | 71627 | 24584 | 0.58 | 0.49 | 3.6 |
| Example 4 (Inventive) | 67.1 | 1.8 | 0.10 | 122 | 21.8 | 269585 | 2239542 | 139912 | 31101 | 0.34 | 0.29 | 8.7 |

While the present disclosure has been described in considerable detail with reference to certain preferred versions thereof, other versions are possible. Also, different types of members and configurations of members can be formed in accordance with the disclosure, in a number of different ways that will be apparent to persons having ordinary skill in the art. Therefore, the spirit and scope of the appended claims should not be limited to the description of the preferred versions contained herein.

All documents cited herein are fully incorporated by reference for all jurisdictions in which such incorporation is permitted and to the extent they are not inconsistent with this specification.

What is claimed is:

1. A process comprising:
   (i) contacting a bridged bis-indenyl transition metal metallocene catalyst compound and a non-coordinating anion (NCA) activator with an alpha-olefin, ethylene, and at least one diene comprising vinyl norbornene (VNB); wherein the NCA activator is dimethyl anilinumtetrakis(heptafluoronaphthyl)borate; wherein the bridged bis-indenyl transitional metal metallocene catalyst compound comprises a cyclopentadienyl (Cp) fused to a phenyl ring; wherein the indenyl complex has the general formula:

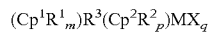

wherein $Cp^1$ of ligand $(Cp^1R^1{}_m)$ and $Cp^2$ of ligand $Cp^2R^2{}_p)$ are the same, $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 1 to 5, p is 1 to 5; and two $R^1$ and two $R^2$ substituents on adjacent carbon atoms of the Cp ring associated therewith are joined together to form a ring containing six carbon atoms, $R^3$ is a bridging group, such that the number of carbon atoms in the direct chain between the two ligands is 2, M is a transition metal having a valence of from 3 to 6, from group 4, 5, or 6 of the periodic table of the elements and is in its highest oxidation state, each X is a non-Cp ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2; and
   (ii) recovering a polymer comprising units derived from alpha-olefin, ethylene, and diene wherein the polymer is free from gel.

2. The process of claim 1, wherein in the bridged bis-indenyl transitional metal metallocene catalyst compound, $R^3$, is $-CR'_2-CR'_2-$; and wherein R' independently is selected from hydrogen, alkyl, aryl, halogenated alkyl, halogenated aryl or any mixtures thereof.

3. The process of claim 1 wherein the alpha-olefin is propylene.

4. The process of claim 1 wherein the bridged bis-indenyl transitional metal metallocene catalyst compound is ethylene-bis-indenyl-zirconium dimethyl.

5. The process of claim 1 wherein the bridged bis-indenyl transitional metal metallocene catalyst compound is ethylene-bis-indenyl-hafnium dimethyl.

6. The process of claim 1 wherein the polymer has a MWD from about 2 to about 20.

7. The process of claim 1 wherein the polymer has a branching index of about 0.1 to about 1.0.

8. The process of claim 1 wherein the alpha-olefin, ethylene, and at least one diene are polymerized at a temperature range of about 20-200° C.

9. The process of claim 2 wherein the alpha-olefin is propylene.

10. The process of claim 2 wherein the bridged bis-indenyl transitional metal metallocene catalyst compound comprises ethylene-bis-indenyl-zirconium dimethyl.

11. The process of claim 2 wherein the bridged bis-indenyl transitional metal metallocene catalyst compound comprises ethylene-bis-indenyl-hafnium dimethyl.

12. The process of claim 2 wherein the polymer has a MWD from about 2 to about 20.

13. The process of claim 12 wherein the polymer has a branching index of about 0.1 to about 1.0.

14. The process of claim 2 wherein the alpha-olefin, ethylene, and at least one diene are polymerized at a temperature range of about 20-200° C.

15. The process of claim 2 wherein the alpha-olefin, ethylene, and at least one diene are polymerized at a pressure of about 50-2000 psi (about 350-14000 kPa).

* * * * *